(No Model.)
J. H. WILSON
COOKING VESSEL.
No. 527,471.  Patented Oct. 16, 1894.
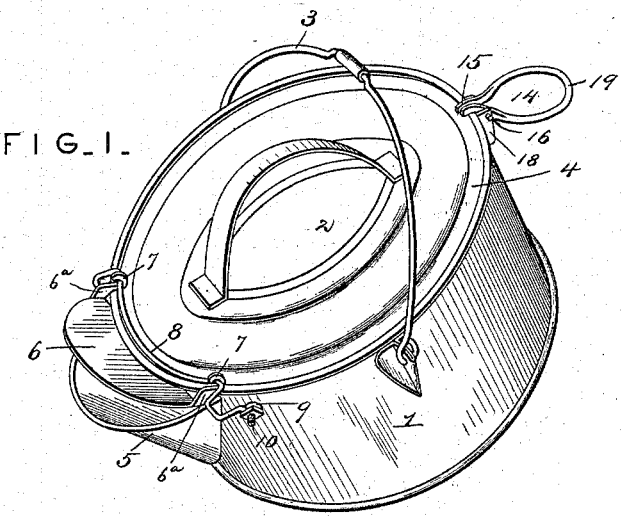
FIG. 1.
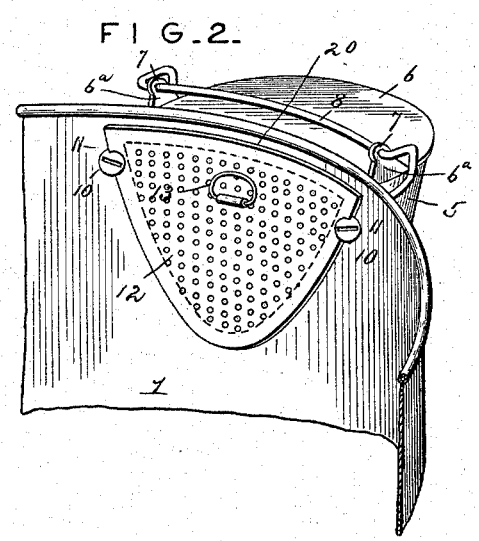
FIG. 2.
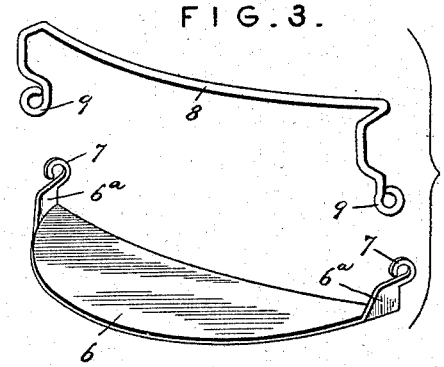
FIG. 3.
FIG. 5.
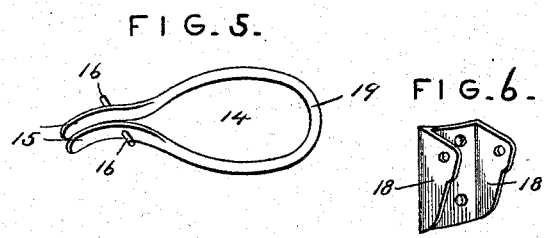
FIG. 6.
FIG. 4.
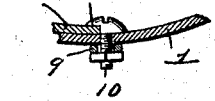
Witnesses
Harry L. Amer.
J. B. Owens
Inventor
John H. Wilson.
By his Attorneys,
C. A. Snow & Co.

UNITED STATES PATENT OFFICE.

JOHN H. WILSON, OF CARLISLE, PENNSYLVANIA, ASSIGNOR OF TWO-THIRDS TO CHARLES E. ZEIGLER AND MILTON I. ZEIGLER, OF SAME PLACE.

COOKING-VESSEL.

SPECIFICATION forming part of Letters Patent No. 527,471, dated October 16, 1894.

Application filed April 17, 1894. Serial No. 507,921. (No model.)

*To all whom it may concern:*

Be it known that I, JOHN H. WILSON, a citizen of the United States, residing at Carlisle, in the county of Cumberland and State of Pennsylvania, have invented a new and useful Cooking-Vessel, of which the following is a specification.

My invention is adapted for use on all kinds of cooking vessels, and is particularly adapted for use on steam cookers, where the food is placed in a boiler or kettle and cooked by heating the water; and the invention consists of an improved device for holding the lid incapable of falling off the vessel and for raising the spout flap or lid upon tilting the vessel to pour out its contents.

These ends I attain by certain novel features of construction and combination and arrangement of parts that will be more fully described hereinafter and finally embodied in the claims.

In the drawings, Figure 1 represents a perspective view of a steam cooker having my improvements applied, and showing its use; Fig. 2, a detail perspective of the spout and its attachments, and showing the strainer for use with the same; Fig. 3, a view of the flapper or spout-lid and bearing-rod removed; Fig. 4, a sectional view illustrating the mode of securing the strainer in place; Fig. 5, an enlarged view, in perspective, of the hand-bail for tilting the vessel; Fig. 6, a detail perspective of the bearing-plates for the lid-retaining lever.

The reference numeral 1 indicates the body of the appliance with which I have shown my invention as used, and this may be of any construction preferred. 2 indicates the top, and 3 the handle, all of which will be understood. The top is arranged on the upper edge of the body 1 and is capable of a slight horizontal movement thereon, owing to the plane portion 4 of its lower periphery. By means of this peculiar construction the lid lies closely upon the upper edge of the body at all times, thereby insuring a steam-tight joint.

5 indicates the spout of the body, and this is provided with the flapper or lid 6, which consists of an integral piece of sheet metal, preferably stamped, and shaped as the upper end or mouth of the spout so as to cover the same. The mouth of the spout 5 is arranged a slight distance below the upper edge of the body 1, so as to allow the lid or top 2 to pass over it.

The spout-lid 6 is formed with the upwardly-projecting spurs $6^a$ on each of its inner corners, and these project upwardly to a point a slight distance above the upper end of the body, and are there provided with the eyes 7. The eyes 7 are formed by stamping a small hook-shaped portion out integral with the flapper, and then bending them downwardly to complete the eyes, they having been first made to embrace the rod 8, by which the flapper is pivoted. The rod 8 is the means whereby the flapper is mounted so as to be capable of swinging in its characteristic lines, and it consists of an integral piece of steel wire, having its ends formed with the eyes 9, whereby it may be secured to the body 1 by means of bolts 10, as will be more fully described hereinafter.

From the eyes 9 the rod curves at each end outwardly and thence upwardly to a point level with the eyes 7, aforesaid, after which it, the rod, extends rearwardly and thence transversely and parallel with the upper edge of the body 1. By means of the forward and rearward bend in the rod 8 a space is left within which the periphery of the lid 2 may move when operating to raise the flapper 6. The eyes 7 are connected to the rod 8 directly adjacent to the upward and rearward bends, just described, and inside the same.

It will be noticed that the rear edges of the lugs or spurs $6^a$ are approximately perpendicular and that they are adjacent to the periphery of the top 2, so as to be engaged thereby. I provide a strainer 12 for the spout 5, and this consists of a heart-shaped section of sheet metal perforated throughout its extent and curved to conform to the curve of the body 1. The strainer is held in place by the heads of bolts or screws 10, which heads are formed with the slots 11 on their adjacent faces. These slots are extended through about one-half of the bolt-heads and are adapted for the reception of the edges of the strainer 12, and to have them secured therein by the engagement of the inclined edges, as will be understood.

13 indicates a ring or bail by which the strainer may be withdrawn or otherwise manipulated.

It will be understood that I am not confined to the use of this particular construction of strainer, since many other forms could be used with equal facility, and in practice will be used.

The rear side of the body 1 is provided with a combined lid-retaining and moving lever 14, and this consists of a malleable casting formed with the finger-ring 19 at its lower end, while its upper portion is provided with the parallel vertical arms 15, having the trunnions 16, formed integral with their outer sides. When the lever 14 is cast, the arms 15 are formed close together, so that the trunnions 16 will be free to enter the openings 17 of the bearing-plates 18. The plates 18 are two in effect, though they are formed of an integral sheet of metal bent in the requisite form.

The plates 18 are fixed to the body 1, near its upper end so that the upper ends of the arms 15 will lie above the upper edge thereof. The trunnions 16 are next inserted in their respective openings and the arms 15 sprung apart, whereupon the trunnions 16 will be firmly seated in the openings, so that the lever may swing thereon.

Owing to the location of the plates 18, the finger-ring 19 will not be allowed to engage the sides of the body and thereby become hot, or make it necessary for one to touch the body in the act of grasping the ring. This end is attained by allowing the upper portion of the ring to engage the edges of the plates, thus making it impossible for the ring to move inward beyond a certain point.

The upper ends of the arms 15 are curved inwardly, so that they will be in position to embrace the edge of the lid, and, upon moving the ring 19 outwardly, these arms will push the lid forwardly and downwardly and hold it tightly in place. Upon the forward movement of the lid 2, the rear edges of the studs or lugs 6ª are engaged at a point below their fulcrum and made to swing outwardly, carrying with them the flapper 6, and thereby raising it from over the spout 5, so as to open the same. In the use of my invention, the kettle is filled with food and operated, as usual, to cook the same. When it is desired to pour the water out of the kettle, the ring 19 and handle 3 should be grasped and the body tilted so as to allow the water to run out of the spout 5.

As the pressure of the kettle's weight is applied to the lever 14, the arms 15 will be moved toward the top or lid 2, which will cause the lid to move forwardly and to engage the studs or lugs 6ª. This will swing the lugs on their fulcrum, rod 8, and cause the flapper 6 to raise and uncover the spout 5, thereby allowing the water to pass out. After the water has been withdrawn, the lever 14 may be released and the kettle allowed to drop to its normal position. When the pressure on the lever 14 has been released, the weight of the flapper 6 will cause it to move downwardly and carry with it the lid 2. By these means the lid is automatically returned to its normal position, as soon as the flapper is allowed to drop.

It will be noticed that the lid 6 and the strainer 12 operate entirely independently and are therefore capable of independent and disconnected use. Any form of strainer may be substituted without affecting the operation of the lid, and the lid may continue to operate irrespective of the condition of the strainer.

By reason of the peculiar construction of the rod 8 and lid 6, the lid may be swung back and into the body 1, when the top 2 is removed, so as to facilitate cleaning. If so desired, the arms 15 may be formed with a normal spring tendency to part, so as to permit compressing them and thereby inserting the trunnions 16 into the openings 17, of the plates 18. This construction will facilitate easier operation, and is, perhaps, preferable to bending the arms out as just described.

It will be noticed that the upper edge of the body 1 lies above the spout 5 and flapper 6, so that there will be no possible way for the steam to escape. This is so, owing to the fact that the lid rests upon the entire and unbroken periphery of the body and leaves no intervening space. It may also be observed that there is no chance of the steam escaping from below the periphery of the body and under the flapper, since the section 20, of the edge is left intact and unbroken, thereby allowing the flapper to snugly engage it, so as to completely close all otherwise existing openings.

Having described my invention, what I claim is—

1. The combination in a cooking vessel, of a body provided with a spout, a bar or rod secured to the body and having a portion projecting horizontally above the mouth of the spout, a flapper or spout-lid arranged over the mouth of the spout and having two lugs rigidly fixed thereto, the lugs being provided with openings by which the flapper may be pivoted to the rod, a top for closing the body and capable of movement toward and from the spout, the top being adapted to engage the lugs on the flapper and thereby raise the flapper, and a lever pivoted to the body and adapted to engage the top so as to move it against the lugs on the flapper, substantially as described.

2. In a cooking vessel, the combination of a body-portion having a spout terminating at its upper end below the upper edge of the body, a rod secured to the body on each side of the spout and extending outwardly, inwardly and thence horizontally so as to form an overhanging horizontal portion, a spout-lid or flapper mounted on the spout and having upwardly-extending lugs formed integral therewith, the lugs being adapted to embrace the horizontal portion of the rod so as to pivotally mount the flapper, a top mounted on the upper end of the body and completely closing the opening therein, said top being adapted to move under the horizontal portion of the rod and engage the lugs on the flapper, thereby raising the same, and a lever fulcrumed to the body and adapted to engage the top rods to move it against the lugs on the flapper, substantially as described.

3. In a cooking vessel, the combination of a body, a lid or top mounted thereon, two bearing-plates fixed to the body, and a lever adapted to engage the top and hold it in place, said lever having two arms with a tendency apart and provided with trunnions thereon, the arms being adapted to be sprung between the plates aforesaid, thereby fulcruming the lever, substantially as described.

In testimony that I claim the foregoing as my own I have hereto affixed my signature in the presence of two witnesses.

JOHN H. WILSON.

Witnesses:
JOHN H. SIGGERS,
HAROLD H. SIMMS.